United States Patent [19]

Patterson et al.

[11] 4,285,039
[45] Aug. 18, 1981

[54] MEMORY ARRAY SELECTION MECHANISM

[75] Inventors: Garvin W. Patterson, Glendale; Wolfgang G. Stehr, Tempe, both of Ariz.

[73] Assignee: Motorola, Inc., Schaumburg, Ill.

[21] Appl. No.: 103,646

[22] Filed: Dec. 14, 1979

Related U.S. Application Data

[63] Continuation of Ser. No. 891,085, Mar. 28, 1978, abandoned.

[51] Int. Cl.³ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,546,680 | 12/1970 | Bahrs et al. | 364/200 |
| 3,745,532 | 7/1973 | Erwin | 364/200 |
| 3,990,052 | 11/1976 | Gruner | 364/200 |
| 4,075,687 | 2/1978 | Nissen et al. | 364/200 |
| 4,079,454 | 3/1978 | Sorenson et al. | 364/200 |
| 4,080,659 | 3/1978 | Francini | 364/200 |
| 4,155,118 | 5/1979 | Lamiaux | 364/200 |

OTHER PUBLICATIONS

Memory Extension Techniques for Minicomputers, Poppendieck et al., Compute 5/77 pp. 5-8 and 72-75.
Control Computer and IM-Byte Memory System, Micro Processor Computer Data Stack-undated-two pp.

*Primary Examiner*—Harvey E. Springborn
*Attorney, Agent, or Firm*—Vincent B. Ingrassia

[57] ABSTRACT

A computer system includes multiple memory arrays, each potentially as large as the maximum number of locations for which the associated processor can generate unique addresses. During the processing of such instructions a memory array selection mechanism permits data to be read from or written into any of the memory arrays. Program control may be transferred from an instruction in one memory array to an instruction in another memory array. In addition, memory references may be made to more than one memory array.

7 Claims, 4 Drawing Figures

MEMORY ARRAY SELECTION MECHANISM

This is a continuation, of application Ser. No. 891,085, filed Mar. 28, 1978, now abandoned.

BACKGROUND OF THE INVENTION

1. Field of Use

The present invention relates to memories for the storage of program instructions and data in a computer system, and, more particularly, to a memory array selection mechanism which provides a processor access to multiple memory arrays. The total number of addressable locations in the memory arrays can exceed the number of unique memory addresses which can be generated by the processor. In addition, the processor may fetch program instructions from one memory array and associated data from another memory array.

2. Prior Art

In general, computer processors generate memory addresses of a fixed length. These addresses are used to access individual storage locations in the computer memory either for program instructions or for data. Most computer systems have a single memory array limited in size to a number of individual storage locations corresponding to the number of unique addresses which can be generated by the processor.

In order to expand the amount of memory locations available for use by the processor, some systems have employed separate memories for instructions and data. This is accomplished, for example, by appending to the memory address an instruction fetch signal generated in the processor. This technique expands the total memory space, but it requires the explicit generation of the processor instruction fetch signal at the processor/memory interface. Moreover, the distinction between memory for instructions and memory for data causes a loss of generality in the use of memory, which precludes applications in which either of the two memory spaces is insufficient, even if the total memory required is less than the total available.

Other systems have employed additional memory array selection registers in the processor. This expands the total memory by permitting memory selection among several memory arrays. However, this arrangement may not allow instructions in one array to access data in another array. In addition, this technique cannot be used with an existing processor without significant processor redesign, including the addition of one or more registers and the associated instructions to control them.

OBJECTS OF THE INVENTION

It is therefore an object of the present invention to provide a memory array selection mechanism in an expanded memory system which permits a processor to access first and second memory arrays, the first storing program instructions and the second storing data.

It is also an object of the present invention to provide a memory array selection mechanism in an expanded memory system which allows.

It is a further object of the present invention to provide a memory array selection mechanism which permits the expansion of the total memory in a computer system.

It is yet another object of the present invention to provide a memory array selection mechanism in an expanded memory system which permits memory references to more than one memory array during the execution of a single instruction cycle.

SUMMARY OF THE INVENTION

The above objects are achieved in a preferred embodiment of the present invention by providing a memory system comprising a plurality of memory arrays, a bus for communicating information between the memory arrays and a data processing system including a processor, the processor being capable of generating a predetermined number of unique memory location addresses, the memory arrays containing a total number of uniquely addressable memory locations exceeding such predetermined number, the memory locations in each memory array being capable of storing either instructions or data, and a memory array selection means responsive to information received over the bus for enabling any of the memory arrays to be addressed by the processor.

During the operation of a computer system incorporating a minimal embodiment of the present invention as shown in FIG. 1, the identity of two memory arrays is known to the memory array selection mechanism. Three operational modes may be identified. In the first mode, both program instructions and data references are located in a primary memory array. In this mode, the computer system operates like an ordinary system having only a single memory array with no provision for array selection.

In the second mode, program instructions fetched from the primary array may specify read or write operations on data storage locations in a secondary array. It will be appreciated that instructions in some processors vary in length and that multiple references to the primary array may be required for the processor to fetch one complete instruction. Also different instructions perform different operations, which may require different amounts of time for completion. Therefore, no fixed relationship exists between the references to the primary array during an instruction fetch and the associated references to the secondary array for data.

The memory array selection mechanism of the present invention responds to information specified via the processor from the computer program concerning a sequence of mixed memory references to the primary and secondary memory arrays, and it directs the execution of such memory references according to the specified sequence.

In the third mode, the memory array selection mechanism controls the transfer of control from an instruction stream in the primary array to a stream in the secondary array. This transfer may be invoked explicity by program statements or automatically upon the occurrence of an interrupt in the processor.

In another embodiment of the invention, the expanded memory system may include N memory arrays, and the memory array selection mechanism selects two memory arrays for accessing during any desired period, including the period of time required to execute a single instruction. Memory references are made to one or the other of the two selected arrays depending upon which array is enabled at any given time.

In yet another embodiment of the invention, any one or more of N memory arrays may be accessed during any desired period.

Thus the present invention permits the expansion of a computer memory space beyond the limits directly addressable by the processor and permits direct references to any memory location in the entire memory space. Such references may be for either instructions or data.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1:
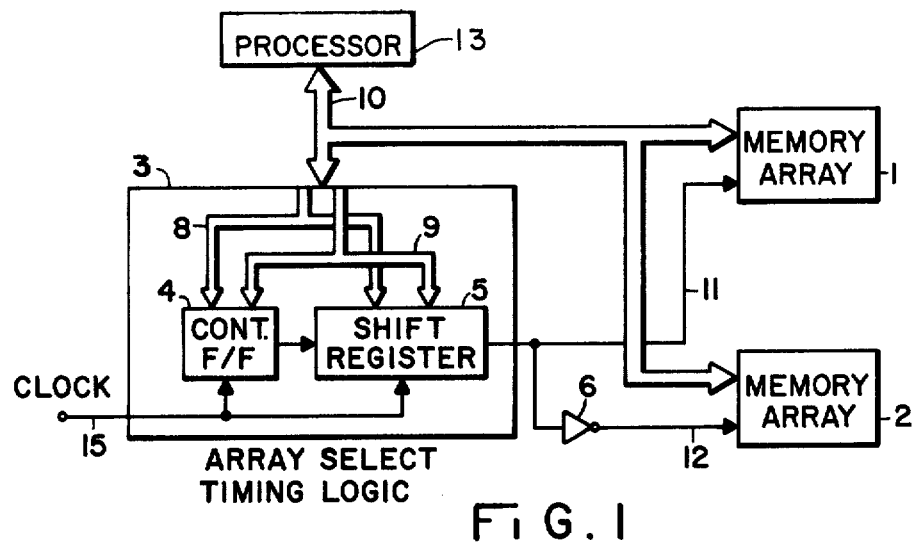
FIG. 1 is a block diagram illustrating a minimum configuration of the present invention.

The invention can be best understood by first referring to the minimal system configuration depicted in FIG. 1 which represents a preferred embodiment. The three major logic blocks illustrated are the array select timing logic 3, memory array 1, and memory array 2.

Memory array 1 and memory array 2 are standard commercially available memory systems connected to the address, data, and control lines of the system bus 10 which bus is also coupled to processor 13. Memory arrays 1 and 2 are enabled by select signals transmitted over select lines 11 and 12, respectively. The select signals are generated in the form of serial output from the array select timing logic 3.

The array select timing logic 3 comprises a parallel-loadable serial in/serial out shift register 5 and a processor-loadable one-bit continue register or flip-flop 4, both being clocked by the system clock over line 15. Shift register 5 and continue register 4 are processor-addressable over address bus portion 8 of system bus 10 and may be parallel-loaded with any desired bit pattern transmitted over data bus portion 9 of system bus 10. System bus 10, in a preferred embodiment, represents the address, data, and control buses of the EXORcisor II development system which is a tool for designing and developing microprocessor based systems and which is commercially available from Motorola, Inc. The EXORcisor II employs an MC6800 microprocessor commercially available from Motorola and fully described in *An Introduction to Microcomputers*, Volume 2, Chapter 6, 1976 and the *M6800 Microcomputer System Design Data* manual, 1976. For shift register 5 standard TTL part SN74166 available from Texas Instruments may be used.

Shift register 5 may be of any desired length but normally would not be longer than the maximum number of processor cycles required to execute the most complex instruction in the processor's instruction set. The continue register 4 merely determines the steady-state level of the array select timing logic output after the preset data pattern loaded into shift register 5 has been shifted out serially. Assuming, for example, that the continue register 4 was preset to a true (1) state and a sufficient number of clock cycles have occurred over clock line 15 to shift out the initial contents of shift register 5, the output from the array select timing logic 3 will continue to remain at a true (1) level. The select signal transmitted over line 11 to memory array 1 will be true (1), and the select signal transmitted over line 12 will be false (0). Under this condition, processor access, and therefore program execution, is restricted entirely to memory array 1. Similarly, a false (0) level state preset in the continue register 4 would have produced a false (0) output from the array select timing logic 3. Memory array 1 would have been deselected, memory array 2 would have been enabled, and program execution in such case would have been restricted to memory array 2.

Now assume again that the contents of the two registers are as described in the first example, i.e., continue register 4 is true (1) and all stages of shift register 5 are true (1). All memory access and program execution will occur in memory array 1. If, however, the program stored in memory array 1 contains one or more instructions which set both the continue register 4 and the shift register 5 to the false (0) state, memory array 1 will be deselected, and program execution will continue in memory array 2. It will be apparent that an instruction in memory array 2 may reset both registers to the true (1) state and transfer program control back to memory array 1.

As mentioned above, shift register 5 may be of any desired length, but normally it would be no longer than the maximum number of clock cycles required to execute the processor's most complex instruction. It should also be clear that shift register 5 and continue register 4 may be preset (parallel-loaded) with any suitable data pattern under program control and that the serial output from shift register 5 controls memory array selection at the system clock rate.

Memory array selection may be dynamic during the execution of a single instruction as shown by the following sequence of events: (1) The processor fetches an instruction from either memory array 1 or 2 to write a specified data pattern into the memory select timing logic 3. (2) As the processor executes the instruction, shift register 5 sequentially transmits the data pattern to memory select lines 11 and 12, so that memory access during each portion of the instruction execution cycle is controlled by the specified data pattern. It is therefore possible, with the present invention, to execute one instruction while utilizing more than one memory array. Instructions, addresses, operands, and portions thereof may be assembled and in turn modified utilizing multiple memory arrays. Once the instruction has been executed, program execution continues, utilizing the memory array or arrays determined by the remaining data bits, if any, in shift register 5 and ultimately the state of continue register 4.

Figure 2:
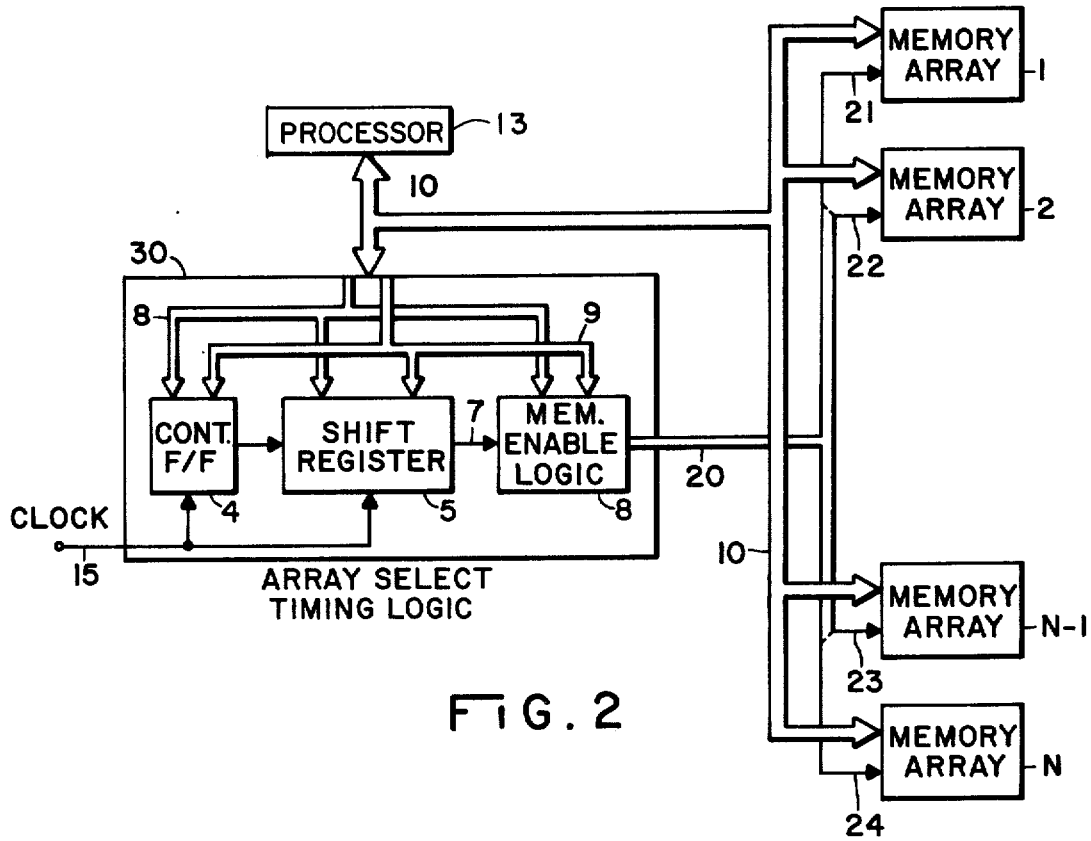
FIG. 2 is a block diagram illustrating an expanded configuration of the present invention.

With reference now to FIG. 2, a block diagram illustrating an expanded configuration of the memory array selection mechanism is shown. The expanded memory system depicted in FIG. 2 represents an extension of the minimum configuration depicted in FIG. 1. The system shown in FIG. 2 comprises a plurality of memory arrays 1-N each connected to the system bus 10. The array select timing logic 30 in FIG. 2 is similar to that contained in the configuration shown in FIG. 1, with the exception that memory enable logic 8 has been added. The details of memory enable logic 8 will be discussed below with reference to FIG. 3. However, the basic operation of memory enable logic 8 can be summarized as choosing between two pre-selected memory arrays of the N possible memory arrays. The pre-selection of the two memory arrays, as well as the selection of which of the two memory arrays is to be referenced in any given cycle or sub-cycle, is made under program control. The configuration shown in FIG. 2 represents an expansion of the configuration shown in FIG. 1 in that the two memory arrays to which memory references may be made are pre-selectable from a total of N memory arrays. Any two desired memory arrays may be pre-selected under program control.

Figure 3:
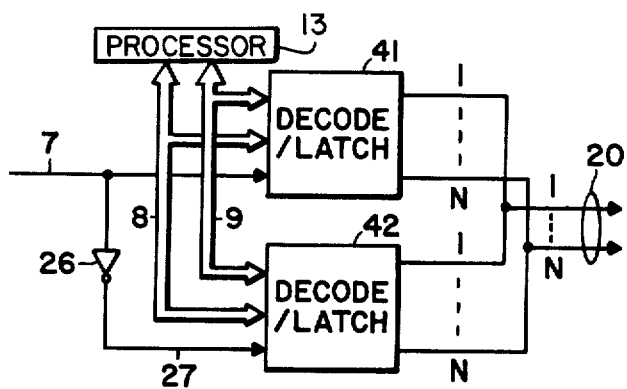
FIG. 3 is a logic diagram illustrating a portion of the configuration shown in FIG. 2.

With reference now to FIG. 3, a detailed block diagram of the memory enable logic 8 shown in FIG. 2 is illustrated. Memory enable logic 8 comprises two 1-of-N decode/latches 41 and 42, and inverter 26. Decode/latches 41 and 42 may be individually addressed by appropriate addresses received over address bus 8 and may each be loaded with data in the form of an array select code received over data bus 9. The array select code loaded into decode/latch 41 sets one of its N output select lines. Similarly, the array select code loaded into decode/latch 42 sets one of its N output select lines.

Each of the N select lines in bus 20 selects a corresponding one of the N memory arrays for a subsequent memory reference by the processor over system bus 10. Since decode/latches 41 and 42 may each set a separate one of the N select lines in bus 20, two memory arrays of the N arrays may be pre-selected at any given time. The particular pattern of data bits loaded into shift register 5 and subsequently shifted out over line 7 determines which of the two selected memory arrays will be enabled. For example, decode/latch 41 will be enabled for each 1 transmitted over line 7. Consequently, the memory array corresponding to the preselected output line of decode/latch 41 will be enabled for each 1 transmitted over line 7 from shift register 5.

Conversely, the pre-selected output line of decode/latch 42 will enable its corresponding memory array for each 0 transmitted by shift register 5 over line 7 through inverter 26 and over line 27 to decode/latch 42. It should be understood that the array select codes are preset under program control in a manner similar to the presetting of the continue register 4 and shift register 5.

Figure 4:
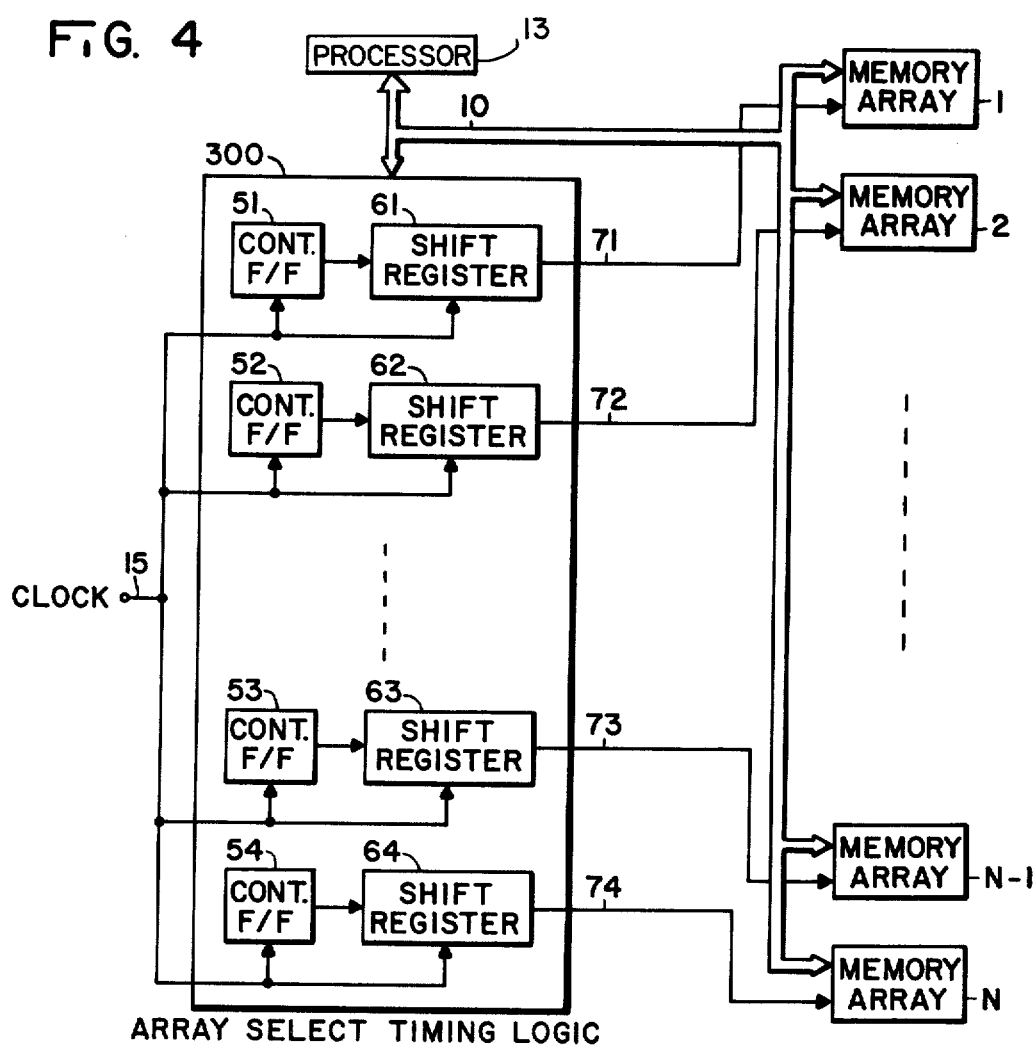
FIG. 4 is a block diagram illustrating yet another embodiment of the present invention.

FIG. 4 is a block diagram illustrating yet another embodiment of the present invention. The expanded memory configuration shown in FIG. 4 permits a sequence of memory references to be made to any of N memory arrays during the execution of a single instruction. Each of the N memory arrays is enabled by its own array select timing logic, comprising a continuation register and a shift register. In FIG. 4 it should be understood that each continue register 51–54 and shift register 61–64 is connected to corresponding address and data portions of the system bus 10 in a manner similar to that shown in FIGS. 1 and 2, and that each register is individually addressable and may be loaded with a unique data bit pattern. By way of example memory array 1 is enabled each time a predetermined level (e.g., a 1) of the bit pattern loaded into continuation register 51 and shift register 61 is generated over line 71. The preset bit patterns loaded into shift registers 61–64 are shifted out over lines 71–74, respectively, in response to clock pulses received over line 15 in a manner similar to that described with reference to FIG. 1.

In utilizing the memory configuration shown in FIG. 4, it is necessary to exercise some care in choosing the bit patterns to be loaded into the shift registers. Normally, the bit patterns should be such that only one memory array of the N possible memory arrays is enabled during a memory cycle. However, multiple memory arrays may be enabled simultaneously if desired. For example, one may desire to write information into multiple arrays simultaneously.

It will be apparent to those skilled in the art that the expanded memory configuration shown in FIG. 4 may be combined with memory enable logic, such as that shown in FIG. 3, to further control the selection of the memory arrays.

It will also be apparent to those skilled in the art that the disclosed Memory Array Selection Mechanism may be modified in numerous ways and may assume many embodiments other than those specifically set out and described above. Accordingly, it is intended by the appended claims to cover all modifications of the invention which fall within the true spirit and scope of the invention.

What is claimed is:

1. An expanded memory system for use in a data processing system including a processor capable of generating a predetermined number of unique memory location addresses, and executing at least one program instruction for controlling the operation of said data processing system, said processor executing said at least one program instruction in one or more instruction execution cycles, each of said cycles being synchronized with a clock signal generated by said processor, said expanded memory system comprising:

first and second memory arrays, said memory arrays containing a combined total number of uniquely addressable memory locations exceeding said predetermined number, said first memory array storing said at least one program instruction and said second memory array storing data, a bus for communicating information and control signals between said data processing system and said memory arrays, said information comprising instructions, data, and memory location addresses, and memory array selection means responsive to said information and said control signals received over said bus for enabling either said first or second memory array to be addressed by said processor, said memory array selection means comprising:

shift register means, said shift register means having a number of stages equal to the number of instruction execution cycles required to execute said at least one program instruction, said shift register means being loadable by said processor with a pattern of data bits over said bus, said shift register means shifting its contents to an output thereof in response to control signals received over said bus, each of said control signals being synchronized with said clock signal, and means responsive to said shift register means output for enabling either said first or second memory array to be addressed by said processor, said first memory array being enabled when said shift register means output is at a first logical level and said second memory array being enabled when said shift register means output is at a second logical level.

2. The expanded memory system recited in claim 1, wherein said memory array selection means further comprises additional register means loadable with a continuation data bit received over said data bus, and generating an output, said shift register means having an input coupled to the output of said additional register means for shifting the contents thereof and generating an output having the logical state of said continuation data bit when said shift register has shifted out its pattern of data bits, whereby said enabling means enables either said first or second memory array upon conclusion of execution of said at least one program instruction depending upon the logical state of said continuation data bit in said additional register means.

3. An expanded memory system for use in a data processing system including a processor capable of generating a predetermined number of unique memory location addresses, and executing at least one program instruction for controlling the operation of said data processing system, said processor executing said at least one program instruction in one or more instruction execution cycles, each of said cycles being synchronized with a clock signal generated by said processor, said expanded memory system comprising:

- a plurality of memory arrays containing a combined total number of uniquely addressable memory locations exceeding said predetermined number,
- a bus for communicating information and control signals between said data processing system and said plurality of memory arrays, said information comprising instructions, data, and memory location addresses, and said control signals including first and second array select codes, and
- memory array selection means responsive to said information received over said bus for enabling first and second ones of said plurality of memory arrays to be addressed by said processor, said memory array selection means comprising:
  - shift register means having a number of stages equal to the number of instruction execution cycles required to execute said at least one program instruction, said shift register means being loadable by said processor with a pattern of data bits over said bus, said shift register means shifting its contents to an output thereof in response to control signals received over said bus, each of said control signals being synchronized with said clock signal,
  - inverter means having an input responsive to said shift register means output, and having an output, and
  - a first one-of-N decode/latch responsive to said shift register means output and being loadable with said first array selection code received over said bus, said first decode/latch generating a first output over a first one of its N output lines in response to said first array select code, and a second one of N decode/latch responsive to said inverter means output and being loadable with said second array select code received over said bus, said second decode/latch generating a second output over a second one of its N output lines in response to said second array select code, each of said memory arrays being responsive to a different one of the N output lines such that said first and second outputs select only said first of said plurality of memory arrays and said second of said plurality of said memory arrays for possible addressing by said processor until at least one of said first and second array select codes is changed.

4. An expanded memory system for use in a data processing system including a processor capable of generating a predetermined number of unique memory location addresses, and executing at least one program instruction for controlling the operation of said data processing system, said processor executing said at least one program instruction in one or more instruction execution cycles, each of said cycles being synchronized with a clock signal generated by said processor, said expanded memory system comprising:

- a plurality of memory arrays, said plurality containing a combined total number of uniquely addressable memory locations exceeding said predetermined number,
- a bus for communicating information and control signals between said data processing system and said plurality of memory arrays, said information comprising instructions, data, and memory location addresses, and
- memory array selection means responsive to said information and control signals received over said bus for enabling at least one of said plurality of memory arrays to be addressed by said processor, said memory array selection means comprising:
  - a plurality of shift register means, each one of said plurality of shift register means being associated with a different one of said plurality of memory arrays, each of said shift register means being loadable with a pattern of data bits over said bus, the outputs of each of said shift register means for enabling selected ones of said plurality of memory arrays to be addressed by said processor during each instruction cycle, said selected ones of said plurality of memory arrays being enabled when their associated shift register means output is at a predetermined logic level.

5. The expanded memory system recited in claim 4 wherein said data bit patterns are arranged such that more that one data bit occupying the same position in two or more of said shift register means is at said predetermined logic level whereby more than one of said memory arrays is enabled to be addressed simultaneously by said processor during a given instruction execution cycle.

6. The expanded memory system recited in claim 4 wherein said data bit patterns are arranged such that only one data bit at a specific bit position in only one of said plurality of shift register means is at said predetermined logic level, the data bits at corresponding bit positions in others of said plurality of shift register means which are equipped with said corresponding bit positions being at a different logic level whereby only one memory array is enabled to be addressed by said processor during each instruction cycle.

7. The memory system recited in claim 4 wherein said memory array selection means further comprises a plurality of additional register means, each one of said plurality of additional register means associated with a different one of said plurality of shift register means and loadable with a continuation data bit received over said bus, only one of said continuation data bits being at a predetermined logic level, each of said additional register means generating an output, each of said shift register means having an input coupled to the output of its associated additional register means for shifting the contents thereof and generating an output having the logical state of said continuation data bit when said shift register means has shifted out its pattern of data bits, whereby said enabling means enables only one of said plurality of memory arrays upon conclusion of execution of said at least one program instruction.

* * * * *